United States Patent
Kim (10) Patent No.: US 9,588,607 B2
(45) Date of Patent: Mar. 7, 2017

(54) METHOD FOR IMPROVING TOUCH RECOGNITION AND ELECTRONIC DEVICE THEREOF

(71) Applicant: Samsung Electronics Co., Ltd., Gyeonggi-do (KR)

(72) Inventor: Sang-Heon Kim, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 334 days.

(21) Appl. No.: 13/923,640

(22) Filed: Jun. 21, 2013

(65) Prior Publication Data
US 2013/0342485 A1  Dec. 26, 2013

(30) Foreign Application Priority Data
Jun. 22, 2012 (KR) .................. 10-2012-0067194

(51) Int. Cl.
*G06F 3/041* (2006.01)
*G06F 3/0488* (2013.01)

(52) U.S. Cl.
CPC .......... *G06F 3/041* (2013.01); *G06F 3/04883* (2013.01)

(58) Field of Classification Search
CPC .............. G06F 3/03; G06F 3/041; G06F 9/44
See application file for complete search history.

(56) References Cited

U.S. PATENT DOCUMENTS

| | | | |
|---|---|---|---|
| 2008/0284754 A1 | 11/2008 | Kao et al. | |
| 2009/0288044 A1 | 11/2009 | Matthews et al. | |
| 2009/0292989 A1 | 11/2009 | Matthews et al. | |
| 2010/0066705 A1* | 3/2010 | Keely et al. | 345/179 |
| 2010/0097335 A1 | 4/2010 | Jung et al. | |
| 2010/0141589 A1* | 6/2010 | Hoover | G06F 3/0425 345/173 |
| 2010/0156833 A1 | 6/2010 | Kim et al. | |
| 2012/0212440 A1* | 8/2012 | Nishida et al. | 345/173 |

FOREIGN PATENT DOCUMENTS

| | | |
|---|---|---|
| EP | 1 607 847 A1 | 12/2005 |
| KR | 10-2009-0075529 A | 7/2009 |
| WO | 2011/048840 A1 | 4/2011 |

OTHER PUBLICATIONS

Taiwan Search Report dated Sep. 23, 2016.

* cited by examiner

*Primary Examiner* — Kenneth Bukowski
(74) *Attorney, Agent, or Firm* — Cha & Reiter, LLC (57) ABSTRACT

A method for recognizing touch information in an electronic device and an electronic device. The method includes, when a touch is detected, determining whether or not a touch input mode for the touch; determining a reference distance in consideration of the touch input mode; and determining an event type corresponding to the touch by comparing a change distance of a touch point related to the touch with the reference distance.

22 Claims, 7 Drawing Sheets

METHOD FOR IMPROVING TOUCH RECOGNITION AND ELECTRONIC DEVICE THEREOF

CROSS RELATED APPLICATION

This application claims priority under 35 U.S.C. §119 from an application filed in the Korean Intellectual Property Office on Jun. 22, 2012 and assigned Serial No. 10-2012-0067194, the contents of which are incorporated herein by reference in its entirety.

BACKGROUND

1. Field of the Invention

The present disclosure relates generally to an electronic device having a touchscreen. More particularly, the present invention relates to an apparatus and method for recognizing a touch in an electronic device having a touchscreen.

2. Description of the Related Art

As the use of a multimedia service using an electronic device increases, the amount of information to be processed by the portable electronic device and the amount of information to be displayed increases. As a result, there is an increasing interest in an electronic device having a touchscreen in which the space thereof is more efficiently used and the size of the display unit thereof can be increased due in part to the increased efficiency over.

The touchscreen is an input/output device for performing the input and displaying information on the touchscreen. Therefore, when the electronic device includes the touchscreen for input as well as output, a separate input device such as a physical keypad is not required in the portable electronic device, which in turn permits an increase in the display area thereof.

However, since the electronic device having the touchscreen does not include a separate input device such as a keypad, the operation of such an electronic device is different from that of electronic devices having a separate input device. Accordingly, the electronic device having the touchscreen requires a separate user interface for the touchscreen because the touchscreen operates as both an input and an output.

SUMMARY

The present invention addresses at least some of the above problems and/or disadvantages of known electronic devices by providing an apparatus and method for recognizing touch information in an electronic device having a touchscreen.

The present invention can provide an apparatus and method for setting a reference distance in an electronic device having a touchscreen for touch recognition to reduce a recognition error of touch information.

The present invention can provide an apparatus and method for adaptively determining a reference distance in an electronic device having a touchscreen for touch recognition to reduce a recognition error of touch information.

The present invention can provide an apparatus and method for adaptively determining a reference distance mode in an electronic device having a touchscreen for touch recognition according to a touch input.

The present invention can provide an apparatus and method for recognizing a touch tap in an electronic device having a touchscreen in consideration of a reference distance for touch recognition.

The present invention can provide an apparatus and method for adaptively determining a reference distance in an electronic device having a touchscreen for touch-tap recognition.

The present invention can provide an apparatus and method for adaptively determining a reference distance in an electronic device having a touchscreen for touch-tap recognition according to a characteristic of an application program.

The present invention can provide an apparatus and method for adaptively determining a reference distance in an electronic device having a touchscreen for touch-tap recognition according to a characteristic of a user interface.

The present invention can provide an apparatus and method for adaptively determining a reference distance in an electronic device having a touchscreen for touch-tap recognition according to a characteristic of a touch point.

The present invention can provide an apparatus and method for recognizing a touch tap in an electronic device having a touchscreen by using a reference distance for touch-tap recognition at a time when a touch is released.

According to a first exemplary aspect of the present invention, a method for recognizing touch information in an electronic device preferably includes: when a touch is detected, determining a touch input mode for the touch; determining a reference distance in consideration of the touch input mode; and determining an event type corresponding to the touch by comparing a change distance of a touch point related to the touch with the reference distance.

According to a second exemplary aspect of the present invention, an electronic device preferably includes: a touchscreen; and a touch processing unit for determining a reference distance in consideration of a touch input mode for the touch, when a touch on the touchscreen is detected, and determining an event type for the detected touch by comparing a change distance of a touch point at which the touch is detected with the reference distance.

BRIEF DESCRIPTION OF THE DRAWINGS

The above attributes and other characteristics and advantages of the present invention will be better-appreciated by a person of ordinary skill in the art from the following detailed description when taken in conjunction with the accompanying drawings in which.

DETAILED DESCRIPTION

Exemplary embodiments of the present invention will be described herein below with reference to the accompanying drawings. In the following description, detailed descriptions of well-known functions or configurations may be omitted when their inclusion would unnecessarily obscure appreciation of the subject matters of the present invention by a person of ordinary skill in the art. Also, the terms used herein are defined according to the functions of the present invention. Thus, the terms may vary depending on users' or operators' intentions or practices. Therefore, the terms used herein must be understood as would be understood by a person of ordinary skill in the art based on the descriptions made herein.

The present invention provides a technique for recognizing touch information in an electronic device having a touchscreen.

In the following description, examples of the electronic device may include but are not limited to a portable electronic device having a touchscreen, a portable terminal, a mobile communication terminal, a personal digital assistant (PDA), a laptop computer, a smart phone, a netbook, a television, a mobile internet device (MID), an ultra mobile personal computer (UMPC), a tablet PC, a desktop computer, a smart TV, a digital camera, a wristwatch, a navigation device, an MP3 player, and the like, just to name some non-limiting possibilities. In addition, the electronic device may include any wireless device having a combination of the functions of two or more devices from among the examples of the above-described devices.

The present invention also can provide a technique for identifying an event type corresponding to touch information detected through a touchscreen in an electronic device. In particular, in the following description, a technique for identifying a touch tap and a drag according to touch information detected through the touchscreen in the electronic device is described as one non-limiting example. A user performs a touch down operation and a touch up operation with respect to a specific point on the touchscreen for touch-tap input. However, a touch sensor of the electronic device may detect "n" number of touch movements between a touch down and a touch up. Therefore, the electronic device may identify a drag corresponding to a touch tap and a touch movement by ignoring a touch movement generated within a reference distance from touch coordinates which are touched down among the touch movements generated between the touch down and the touch up. For example, the touch tap is a series of operations for a user to touch down and then touch up with respect to a specific point on the touchscreen for a click on the specific point. The touch up is an operation of releasing the touch detected as the touch down on the touchscreen.

Figure 1:
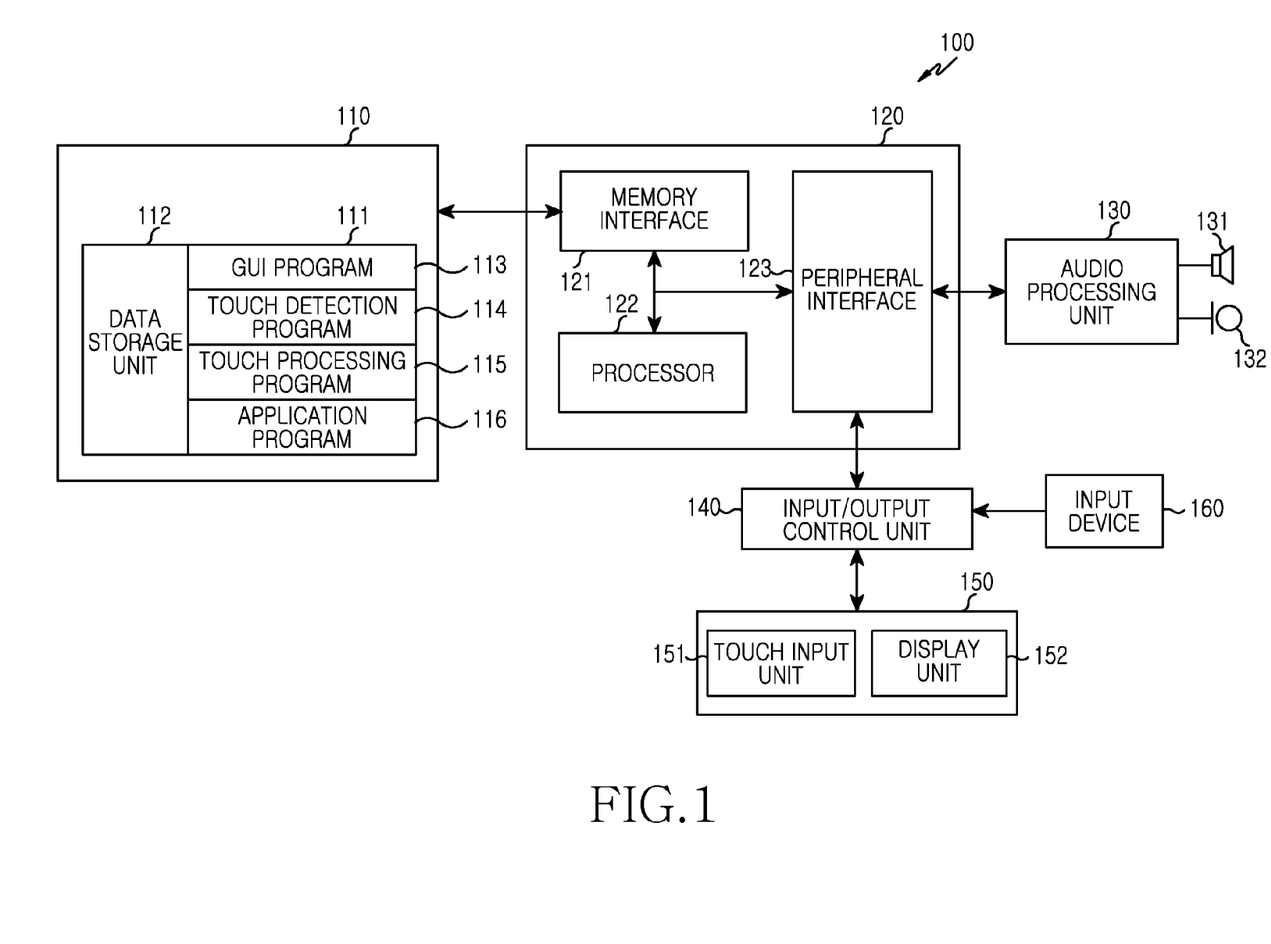
FIG. 1 is a diagram illustrating one example of a block configuration of an electronic device according to an exemplary embodiment of the present invention.

FIG. 1 illustrates exemplary operation of a block configuration of an electronic device according to an exemplary embodiment of the present invention.

Referring now to the example FIG. 1, the electronic device 100 can includes a memory 110, a processor unit 120, an audio processing unit 130, an input/output control unit 140, a touchscreen 150, and an input device 160. Herein, the memory 110 may be provided as a plurality of different types of storage.

The respective components will be described herein below.

The memory 110 comprises one or more non-transitory machine readable mediums may include storage of machine executable code in a program storage unit 111 for storing a program for controlling an operation of the electronic device 100, and a data storage unit 112 for storing data generated during the execution of a program by hardware such as a processor or microprocessor.

The program storage unit 111 preferably includes a Graphic User Interface (GUI) program 113, a touch detection program 114, a touch processing program 115, and at least one application program 116. Herein, the programs stored in the program storage unit 111 may be expressed as an instruction set that comprises a set of instructions that are loaded into a processor, microprocessor or controller for execution.

The GUI program 113 includes at least one software component (machine executable code) that is loaded into hardware and executed for providing a graphic user interface on a display unit 152. For example, the GUI program 113 includes an instruction for displaying information about application programs being executed by the processor 122 on the display unit 152.

The touch detection program 114 can include at least one software component (machine executable code) that is loaded into hardware and executed for converting touch information, detected through a touch input unit 151, into the form of an instruction. For example, the touch detection program 114 may convert the touch information, detected through a touch input unit 151, into the form of an instruction such as a touch down, a touch movement, or a touch up.

With continued reference to FIG. 1, the touch processing program 115 includes at least one software component (machine executable code) that is loaded into hardware and executed for identifying a touch tap and a drag according to a touch instruction determined by the touch detection program 114. For example, the touch processing program 115 may identify the touch tap and the drag by comparing the change distance of touch coordinates according to a touch movement detected between a touch down and a touch up with a reference distance. In this case, for example, the touch processing program 115 may adaptively determine the reference distance according to a touch input mode.

In another example, the touch processing program 115 may determine whether or not to use a reference distance in order to identify the touch tap and the drag in consideration of at least one of a characteristic of an application program that is being executed in the electronic device 100, a characteristic of an user interface displayed on the display unit 152, and a characteristic of a touch point. Herein, the reference distance may be fixedly defined in respective electronic devices or can be determined in consideration of the size and resolution of a display unit in the electronic device.

The application program 116 includes a software component (machine executable code) that is loaded into hardware and executed for at least one application program installed in the electronic device 100.

The processor unit 120, which comprises hardware that executes machine executable code that configures processor for operation, may include a memory interface 121, at least one processor 122, and a peripheral interface 123. Herein, the memory interface 121, the at least one processor 122 and the peripheral interface 123 which are included in the processor unit 120 may be integrated into at least one integrated circuit, or can be implemented as separate components.

The memory interface 121 executes code for controlling the access to the memory 110 by components such as the processor 122 and the peripheral interface 123.

The peripheral interface 123 controls the connection of an input/output peripheral device of the electronic device 100 to the processor 122 and the memory interface 121.

The processor 122, which comprises hardware such as, for example, a microprocessor or processor, enables the electronic device 100 to provide various multimedia services by executing at least one software program loaded therein. In this case, the processor 122 can execute at least one program stored in the memory 110 and provide or control one or more functions corresponding to execution of the program.

The audio processing unit 130 comprises a codec and provides an audio interface between a user and the electronic device 100 through, for example, a speaker 131 and a microphone 132.

The input/output control unit 140 comprises hardware and provides an interface between the input/output devices such as the touchscreen 150 and the input device 160, and the peripheral interface 123.

The touchscreen 150 is an input/output device for performing the input and output of information and includes a touch input unit 151 and a display unit 152 for respective input and output. The touchscreen can comprise, for example, a thin-film technology (TFT) structure.

The touch input unit 151 provides touch information detected through a touch panel to the processor unit 120 through the input/output control unit 140. The touch input unit may comprise, for example, a virtual keyboard.

The display unit 152 outputs a display of the status information of the electronic device 100, as well as characters input by the user, moving pictures, still pictures, or the like.

The input device 160 provides input data generated by the selection of the user to the processor unit 120 through the input/output control unit 140. For example, the input device 160 includes only control buttons for control of the electronic device 100. The control buttons may comprise function keys. In another example, the input device 160 may include a keypad for receiving input data from the user.

Although not illustrated in the drawings, the electronic device 100 may further include a communication system for performing at least one of a voice communication and a data communication function. In this case, the communication system may be divided into a plurality of communication sub-modules which support different communication networks. For example, the communication networks may include, but not limited to, a Global System for Mobile communication (GSM) network, an Enhanced Data GSM Environment (EDGE) network, a Code Division Multiple Access (CDMA) network, a Wideband Division Multiple Access (W-CDMA) network, a Long Term Evolution (LTE) network, an Orthogonal Frequency Division Multiple Access (OFDMA) network, a wireless LAN, a Bluetooth network and a Near Field Communication (NFC) network, and the like.

Figure 2:
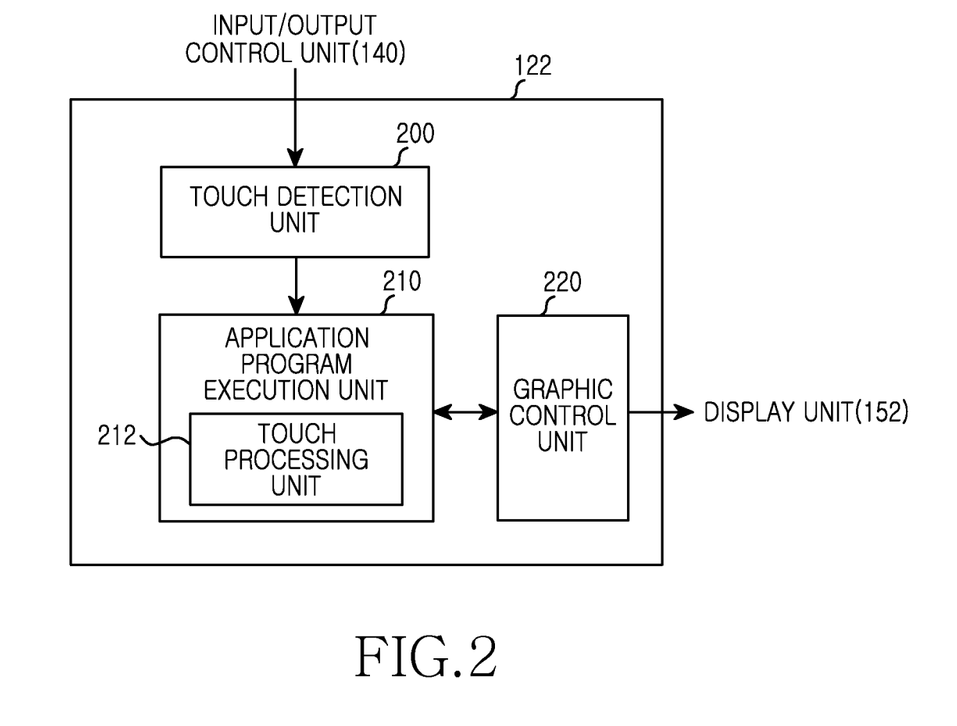
FIG. 2 is a diagram illustrating one example of a detailed block configuration of a processor according to an exemplary embodiment of the present invention.

FIG. 2 illustrates a detailed block configuration of the processor 122 according to an exemplary embodiment of the present invention.

As illustrated in FIG. 2, the processor 122 can include a touch detection unit 200, an application program execution unit 210, and a graphic control unit 220. An artisan should understand and appreciate that under the broadest reasonable interpretation, the elements in FIG. 2 constitute statutory subject matter and can share hardware such an integrated circuitry for operation, and/or processors, sub-processors.

With continued reference to FIG. 2, the touch detection unit 200 includes hardware for generating an instruction corresponding to the touch information detected through the touch input unit 151 by executing the touch detection program 114 stored in the program storage unit 111, and transmits the instruction to the application program execution unit 210. For example, the touch detection unit 200 may generate an instruction, such as a touch down, a touch movement, or a touch up, according to the touch information detected through the touch input unit 151 and transmit the instruction to the application program execution unit 210.

In addition, in one example, the touch detection unit 200 transmits touch input mode information for the touch information to the application program execution unit 210. In example, the touch detection unit 200 may transmit the touch input mode information to the application program execution unit 210 in the form of an instruction for the touch information. In another example, the touch detection unit 200 may transmit the touch input mode information to the application program execution unit 210 by using a separate control signal. In another example, the touch detection unit 200 may transmit the touch input mode information to the application program execution unit 210 by using a touch input mode identifiers. In this case, the touch detection unit 200 may identify the touch input mode in consideration of the type of an input module which detects the touch information in the touch input unit 151. More specifically, the touch input unit 151 may include different input modules for respective touch input modes. Therefore, the touch detection unit 200 may identify the touch input mode in consideration of the input module which detects the touch information. Herein, the touch input mode information represents a mode of inputting touch information through the touch input unit 151, such as a hand touch or a pen touch. It should also be understood that throughout the application, the term "touch" includes non-contact that comes within a predetermined distance of the touchscreen so as to be sensed.

The application program execution unit 210 includes hardware for executing any one of one or more application programs 116 stored in the program storage unit 111 to provide a service corresponding to the application program. In this case, the application program execution unit 210 may execute an application program according to a touch tap or a drag operation determined by the touch processing unit 212.

Figure 4:
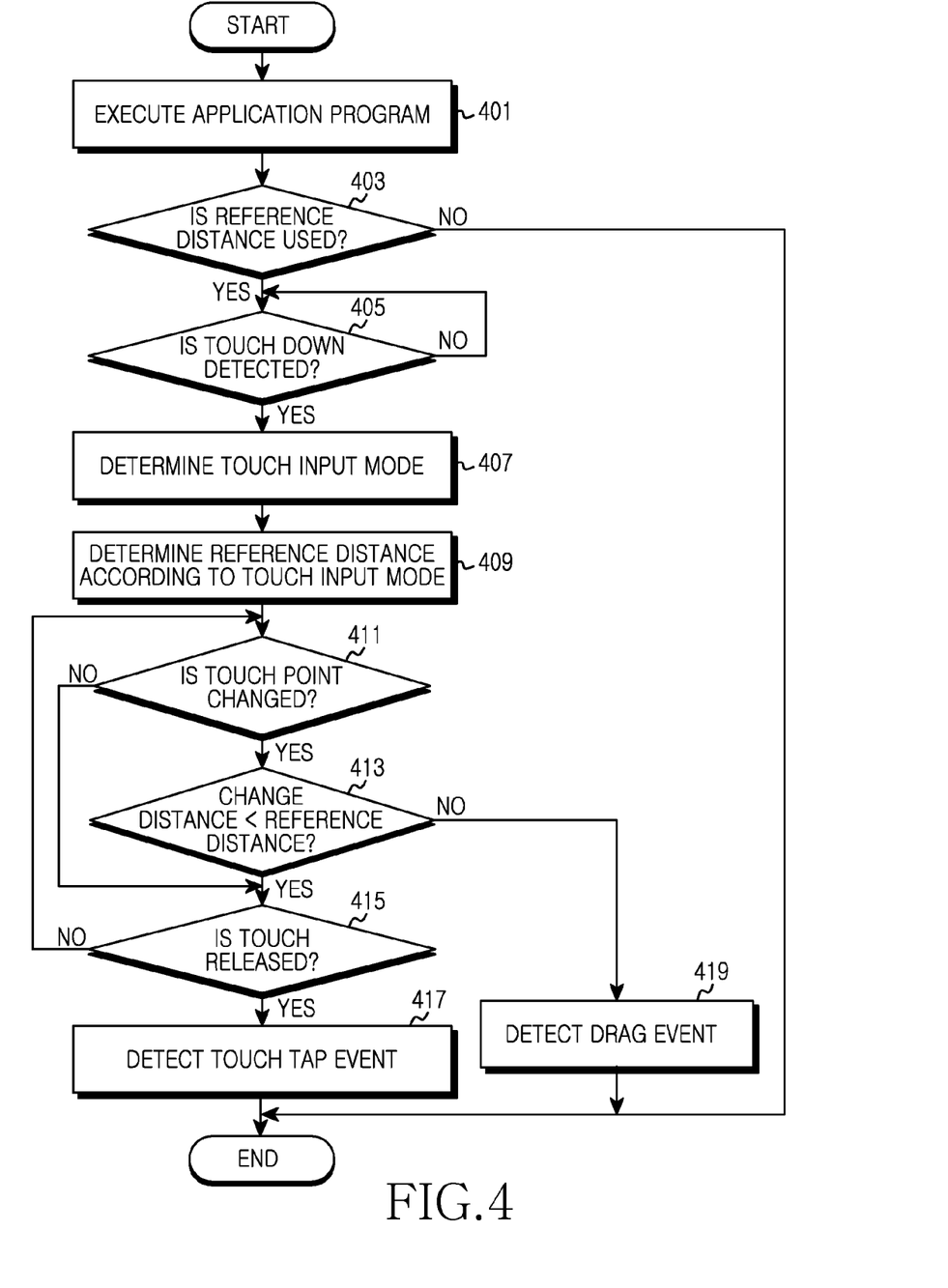
FIG. 4 is a diagram illustrating exemplary operation of a process for recognizing a touch tap according to a characteristic of an application program in an electronic device according to an exemplary embodiment of the present invention.
Figure 5:
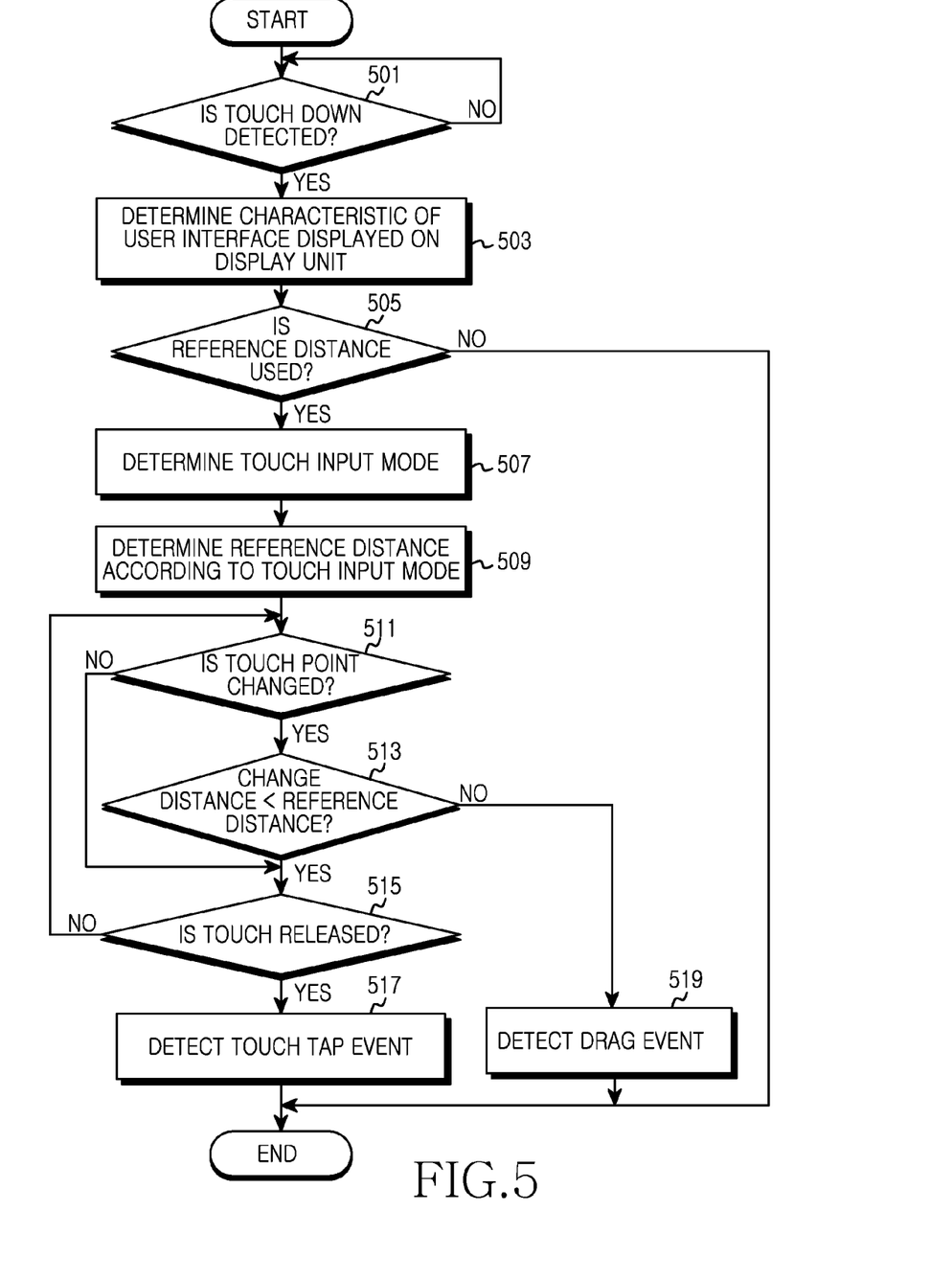
FIG. 5 is a diagram illustrating an exemplary operation of process for recognizing a touch tap according to a characteristic of a user interface in an electronic device according to an exemplary embodiment of the present invention.
Figure 6:
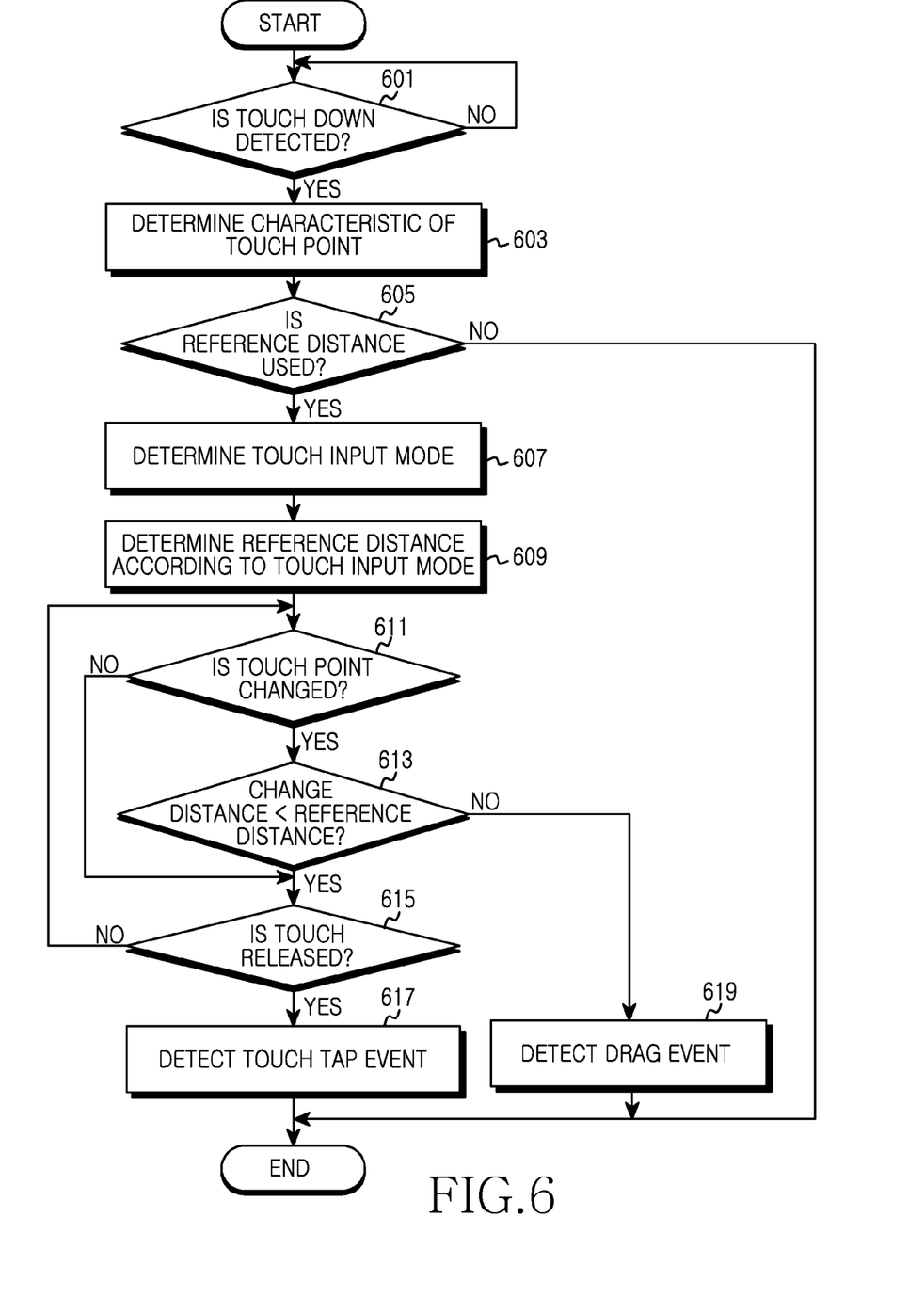
FIG. 6 is a diagram illustrating exemplary operation of a process for recognizing a touch tap according to a characteristic of a touch point in an electronic device according to an exemplary embodiment of the present invention.

The touch processing unit 212 recognizes a touch tap and a drag in consideration of an instruction received from the touch detection unit 200. For example, the touch processing unit 212 may determine whether a touch movement is generated between the touch down and the touch up detected by the touch detection unit 200 by executing the touch processing program 115 stored in the program storage unit 111. If the touch movement is generated between the touch down and the touch up, the touch processing unit 212 may identify the touch tap and the drag by comparing the change distance of touch coordinates corresponding to the touch movement with the reference distance. In this case, the touch processing unit 212 may adaptively determine the reference distance according to a touch input mode. Herein, the touch input mode includes a hand touch input mode and a pen touch input mode. In another example, the touch processing unit 212 may selectively use the reference distance for identification of the touch tap and the drag in consideration of at least one of an characteristic of an application program which is being executed by the application program execution unit 210, a characteristic of a user interface displayed on the display unit 152, and a characteristic of a touch point, as illustrated in FIGS. 4 to 6.

The graphic control unit 220 enables the display unit 152 to display information about the application program executed by the application program execution unit 210 in order for the user to determine the information.

In the above-described exemplary embodiment, the electronic device 100 may recognize the touch tap and the drag by using the processor 122 including the touch detection unit 200, the application program execution unit 210, and the graphic control unit 220.

In another exemplary embodiment, the electronic device 100 may recognize the touch tap and the drag by using one module included in the processor 122.

In the above-described exemplary embodiment, the electronic device 100 may generate an instruction for the touch information detected through the touch input unit 151 by using the touch detection unit 200 of the processor 122.

In another exemplary embodiment, the electronic device 100 may generate an instruction for the touch information by using the touch input unit 151 and provide the instruction to the processor unit 120.

A method for recognizing a touch tap in an application that is being executed by the application program execution unit 210 will now be described below.

Figure 3:
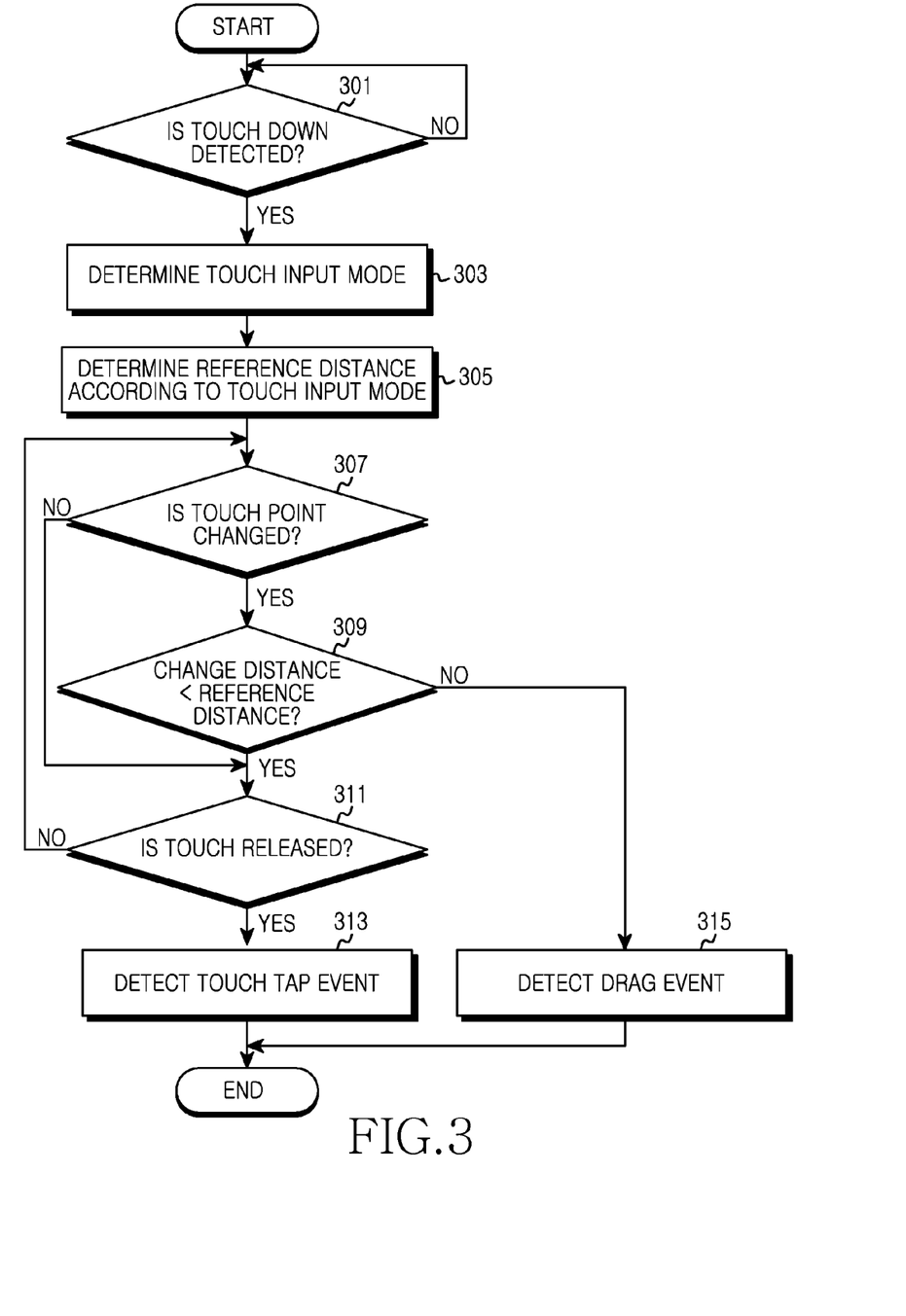
FIG. 3 is a diagram illustrating exemplary operation of a process of recognizing a touch tap in an electronic device according to an exemplary embodiment of the present invention.

FIG. 3 is a flowchart illustrating exemplary operation of a process for recognizing a touch tap in the electronic device according to an exemplary embodiment of the present invention.

Referring now to FIG. 3, in step 301, the electronic device determines whether or not a touch down is detected during execution of an application program. For example, the electronic device 100 may determine whether the touch down is detected through the touch input unit 151 illustrated in FIG. 1.

When the touch down is detected, the electronic device performs step 303, where the electronic device determines a touch input mode for the touch down. For example, the electronic device may determine about the way the touch down was made, such as whether the touch down detected in step 301 is generated by a hand touch or a pen touch.

After the determining of the touch input mode, in step 305, the electronic device determines a reference distance according to the touch input mode. For example, when touch information entered by the hand touch is detected, the electronic device may select a first reference distance in a reference distance list according to touch input modes. On the order hand, when touch information by the stylus pen touch is detected, the electronic device may select a second reference distance in the reference distance list according to touch input modes. Herein, the second reference distance is longer than the first reference distance.

With continued reference to FIG. 3, in step 307, the electronic device determines whether a touch point is changed. In other words, the electronic device may determine whether the touched-down point detected in step 301 has changed by a touch movement.

When the touch point is not changed, the electronic device performs step 311, at which the electronic device determines whether the touch down detected in step 301 is released (e.g. detecting whether a touch up is detected).

On the other hand, at step 307 when determining the touch point is changed, the electronic device next performs step 309. In step 309, the electronic device compares the change distance of the touch point with the reference distance in order to determine whether the change distance of the touch point is changed over the reference distance. In other words, the electronic device may determine whether a movement distance from the coordinates of the touched-down point is less than the reference distance.

When at step 309 the change distance of the touch point is greater than or equal to the reference distance, the electronic device recognizes that the touch point has changed over the reference distance. Therefore, the electronic device performs step 315, in which the electronic device recognizes that a drag event is detected. Therefore, the electronic device performs an operation corresponding to the drag event in the application program.

On the other hand, when at step 309 the change distance of the touch point is less than the reference distance, the electronic device recognizes that the touch point has not changed over the reference distance. Therefore, the electronic device proceeds to step 311. In step 311, the electronic device determines whether or not a touch up is detected. To clarify, the electronic device may determine whether the touch down detected in step 301 is released.

When at step 311 the touch up is not detected, the electronic device re-performs step 307 to again determine whether the touch point has changed.

On the other hand, when the touch up is detected in step 311, the electronic device then performs step 313, in which the electronic device recognizes that a touch tap event is detected. Therefore, the electronic device performs an operation corresponding to the touch tap event in the application program.

Thereafter, the electronic device ends the algorithm.

FIG. 4 is a flowchart illustrates exemplary operation of a process for recognizing a touch tap according to a characteristic of an application program in the electronic device according to an exemplary embodiment of the present invention.

Referring now to FIG. 4, in step 401, a processor or microprocessor of the electronic device executes an application program that is loaded into, for example, the application program execution unit. For example, the electronic device may execute an application program selected by touch information generated by a user.

Thereafter, in step 403, the electronic device determines whether to use a reference distance according to a characteristic of the application program, which is being executed, to recognize the touch tap. For example, in a case where an application program needs to provide a selection for information displayed on the display unit 152, the electronic device may determine that the reference distance is being used to recognize the touch tap. On the other hand, in a case where the application program is sensitive to drag information as in drawing design or sketch, the electronic device may determine that the reference distance is not used to recognize the touch tap.

At step 403, after the case of determining that the reference distance is not used to recognize the touch tap, the electronic device ends the algorithm. In this case, the electronic device may not, for example, use the reference distance for recognition of the touch tap or may use a fixed reference distance.

On the other hand, when determining at step 403 that the reference distance is used to recognize the touch tap, then at step 405 the electronic device determines whether the touch down is detected. For example, the electronic device 100 may determine whether the touch down is detected through the touch input unit 151 illustrated in FIG. 1.

At step 405, when the touch down is detected, the electronic device next performs step 407. In step 407, the electronic device determines a touch input mode for the touch down detected at step 405. For example, the electronic device may determine whether the touch down detected in step 405 was generated by a hand touch or by a pen touch (such as a stylus pen). It should again be noted that touch down includes the scenario where, for example, a stylus pen comes within a predetermined distance of the touch screen surface that can be considered a touch down without physical contact.

After the determining of the touch input mode, in step 409, the electronic device determines a reference distance according to the touch input mode.

Thereafter, in step 411, the electronic device determines whether or not a touch point has changed. In other words, the electronic device may determine whether the touched-down point detected in step 405 is changed by a touch movement.

When at step 411 the touch point has not changed, the electronic device next performs step 415. In step 415, the electronic device determines whether a touch up is detected. In other words, at step 415, the electronic device may determine whether the touch down detected in step 405 is released.

On the other hand, when at step 411 the touch point has changed, the electronic device performs step 413. In step 413, the electronic device compares the change distance of the touch point with the reference distance in order to determine whether the change distance of the touch point has changed over the reference distance. In other words, at step 413 the electronic device determines whether the change distance of the touch point is less than the reference distance.

When at step 413 the change distance of the touch point is greater than or equal to the reference distance, the electronic device recognizes that the touch point has changed over the reference distance. Therefore, the electronic device performs step 419. In step 419, the electronic device recognizes that a drag event is detected. Therefore, the electronic device performs an operation corresponding to the drag event in the application program.

On the other hand, when at step 413 the change distance of the touch point is less than the reference distance, the electronic device recognizes that the touch point has not changed over the reference distance. Therefore, the electronic device performs step 415. In step 415, the electronic device determines whether a touch up is detected. In other words, the electronic device may determine whether the touch down detected in step 405 is released.

When in step 415 the touch up is not detected, the electronic re-performs step 411 to again determine whether or not the touch point has changed.

On the other hand, when at step 415 the touch up is detected, the electronic device next performs step 417. In step 417, the electronic device recognizes that a touch tap event is detected. Therefore, the electronic device performs an operation corresponding to the touch tap event in the application program.

Thereafter, the electronic device ends the algorithm.

FIG. 5 is a flowchart illustrating exemplary operation of a process for recognizing a touch tap according to a characteristic of a user interface in the electronic device according to another exemplary embodiment of the present invention.

Referring now to FIG. 5, in step 501, the electronic device determines as to whether or not a whether a touch down is detected during execution of an application program. For example, the electronic device 100 may determine whether or not the touch down is detected through the touch input unit 151 illustrated in FIG. 1.

When at step 501 the touch down event is detected, the electronic device next performs step 503. In step 503, the electronic device determines a characteristic of a user interface displayed on the display unit 152. For example, the electronic device may determines whether an event corresponding to a touch tap can be performed through the user interface displayed on the display unit 152.

Thereafter, in step 505, the electronic device determines whether a reference distance is used according to the characteristic of the user interface to recognize the touch tap. For example, in a case where the event corresponding to the touch tap can be performed through the user interface displayed on the display unit 152, the electronic device can determine that the reference distance is used to recognize the touch tap.

When determining at step 505 that the reference distance is not used to recognize the touch tap, the electronic device ends the algorithm. In this case, the electronic device may not use the reference distance for recognition of the touch tap, or may use a fixed reference distance.

On the other hand, when determining at step 505 that the reference distance is used to recognize the touch tap, the electronic device performs step 507. In step 507, the electronic device determines a touch input mode for the touch down. For example, the electronic device may determine whether the touch down detected in step 501 is generated by a hand touch or a stylus pen touch. Similar to the previous description in FIG. 4, the electronic device can also sense contactless touch coming within a predetermined distance of the touchscreen without making physical contact.

After the determining of the touch input mode, in step 509, the electronic device determines a reference distance according to the touch input mode.

Thereafter, in step 511, the electronic device determines whether a touch point has changed. In other words, the electronic device can determine whether the touched-down point detected in step 501 has changed by a touch movement.

With continued reference to FIG. 5, when the touch point is changed, the electronic device then next performs step 515. In step 515, the electronic device determines whether a touch up is detected. In other words, the electronic device may determine whether the touch down detected in step 501 has been released.

On the other hand, at step 511 when the touch point is changed, the electronic device preforms step 513. In step 513, the electronic device compares the change distance of the touch point with the reference distance in order to determine whether the touch point has changed over the reference distance. In other words, the electronic device can determine whether the change distance of the touch point is less than the reference distance.

When at step 513 the change distance of the touch point is greater than or equal to the reference distance, the electronic device recognizes that the touch point has changed over the reference distance. Therefore, the electronic device performs step 519. In step 519, the electronic device recognizes that a drag event is detected. Therefore, the electronic device performs an operation corresponding to the drag event in the application program.

On the other hand, when the change distance of the touch point is less than the reference distance, the electronic device recognizes that the touch point has not changed over the reference distance. Therefore, the electronic device then performs step 515. In step 515, the electronic device determines whether a touch up is detected. In other words, the electronic device determines whether the touch down detected in step 501 is released.

When at step 515 the touch up is not detected, the electronic device re-perform step 511 to again determine whether the touch point is changed.

On the other hand, when the touch up is detected in step 515, the electronic device next performs step 517. In step 517, the electronic device recognizes that a touch tap event is detected. Therefore, the electronic device performs an operation corresponding to the touch tap event in the application program.

Thereafter, the electronic device ends the algorithm.

FIG. 6 illustrates a process for recognizing a touch tap according to the characteristic of a touch point in an electronic device according to another exemplary embodiment of the present invention.

Referring now to FIG. 6, in step 601, the electronic device determines whether a touch down is detected during execution of an application program. For example, the electronic device 100 may determine whether the touch down is detected through the touch input unit 151 illustrated in FIG. 1.

When the touch down is detected, the electronic device determines a characteristic of the touch point in step 603. For example, the electronic device may detect whether an event corresponding to a touch tap can be performed through the touch point.

Thereafter, in step 605, the electronic device determines whether to use a reference distance according to the characteristic of the touch point to recognize the touch tap. For example, in a case where the event corresponding to the touch tap can be performed through the touch point, the electronic device may determine that the reference distance is used to recognize the touch tap.

When at step 605, after determining that the reference distance is not used to recognize the touch tap, the electronic device ends the algorithm. In this case, the electronic device may not use the reference distance for recognition of the touch tap or may use a fixed reference distance.

On the other hand, when at step 605 the electronic device determines that the reference distance is used to recognize the touch tap, then at step 607 the electronic device determines a touch input mode for the touch down. For example, the electronic device may determine whether the touch down detected in step 601 is generated by a hand touch or a pen touch.

After step 607's determining of the touch input mode, in step 609, the electronic device determines a reference distance according to the touch input mode.

Thereafter, in step 611, the electronic device determines whether a touch point has changed. In other words, the electronic device may determine whether the touched-down point detected in step 601 has changed by a touch movement.

When at step 611, the touch point is not changed, the electronic device determines whether a touch up is detected in step 615. In other words, the electronic device may determine whether the touch down detected in step 601 is released.

On the other hand, when at step 611 the touch point is changed, the electronic device next performs step 613. In step 613, the electronic device compares the change distance of the touch point with the reference distance in order to determine whether the touch point has changed over the reference distance. In other words, the electronic device may determine whether the change distance of the touch point is less than the reference distance.

When at step 613, the change distance of the touch point is greater than or equal to the reference distance, the electronic device recognizes that the touch point has changed over the reference distance. Therefore, the electronic device performs step 619. In step 619, the electronic device recognizes that a drag event is detected. Therefore, the electronic device performs an operation corresponding to the drag event in the application program.

On the other hand, when at step 613 the change distance of the touch point is less than the reference distance, the electronic device recognizes that the touch point is not changed over the reference distance. Therefore, the electronic device proceeds to step 615. In step 615, the electronic device determines whether a touch up is detected. In other words, the electronic device may determine whether the touch down detected in step 601 is released.

When at step 615 the touch up is not detected, the electronic device re-performs step 611 to again determine whether the touch point is changed.

On the other hand, when the touch up is detected in step 615, the electronic device then performs step 617. In step 617, the electronic device recognizes that a touch tap event is detected. Therefore, the electronic device performs an operation corresponding to the touch tap event in the application program.

Thereafter, the electronic device ends the algorithm.

According to the above-described exemplary embodiment, the electronic device can selectively use a reference distance according to a touch input mode to prevent the touch tap from not being recognized due to a minute touch movement detected between a touch down and a touch up.

Figure 7:
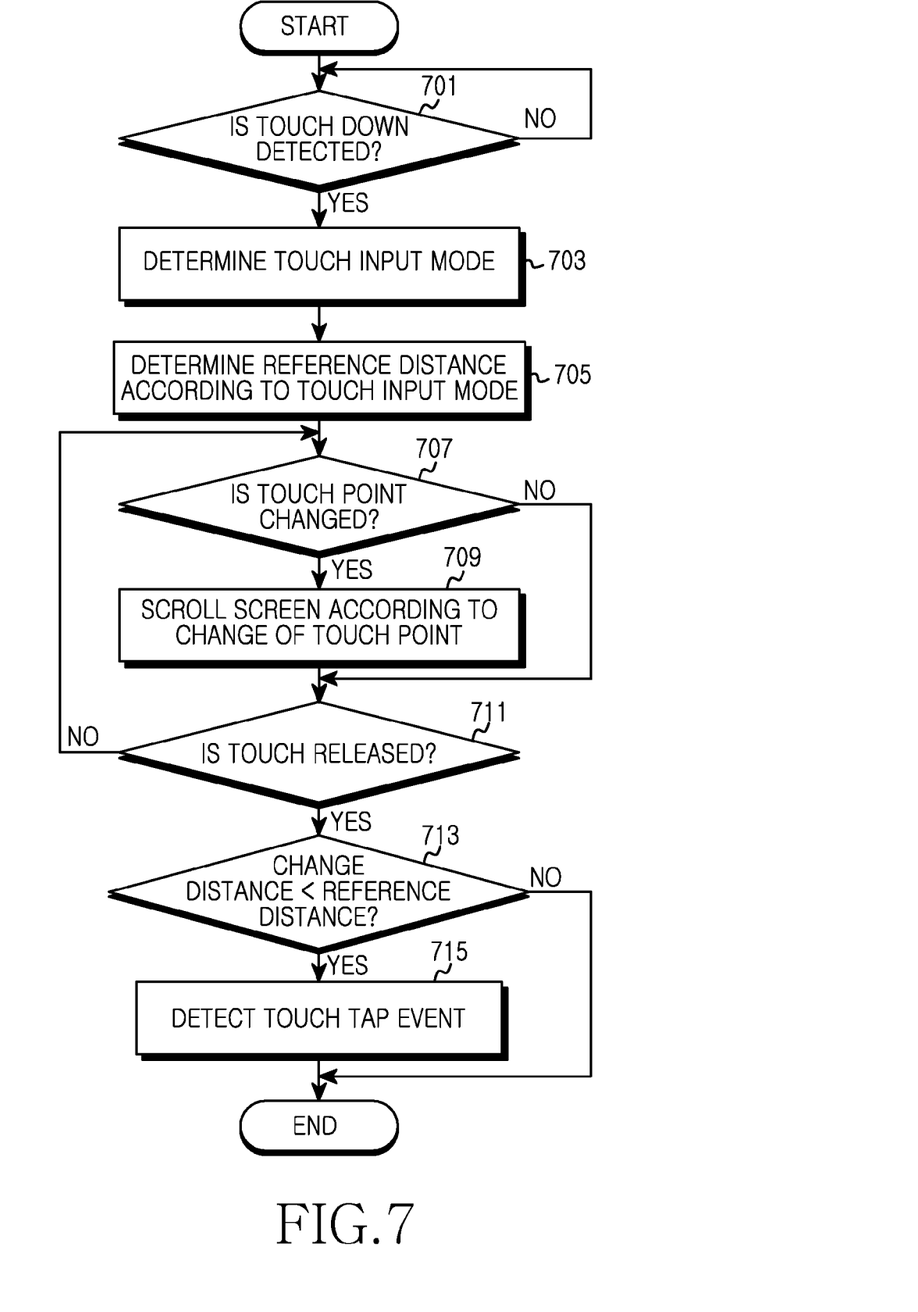
FIG. 7 is a diagram illustrating exemplary operation of a process of recognizing a touch tap in an electronic device according to another exemplary embodiment of the present invention.

In another exemplary embodiment, the electronic device can use a reference distance according to a touch input mode at the time of a touch up to recognize a touch tap, as illustrated in FIG. 7.

FIG. 7 illustrates a process for recognizing a touch tap in the electronic device according to another exemplary embodiment of the present invention.

Referring now to FIG. 7, in step 701, the electronic device determines whether a touch down is detected during execution of an application program. For example, the electronic device 100 can determine whether the touch down is detected through the touch input unit 151 illustrated in FIG. 1.

When in step 701, the touch down is detected, then in step 703, the electronic device determines a touch input mode for the touch down. For example, the electronic device may determine whether or not the touch down detected in step 701 is generated by a hand touch or a stylus pen touch.

After determining at step 703 the touch input mode, then in step 705, the electronic device determines a reference distance according to the touch input mode. For example, when touch information by the hand touch is detected, the electronic device may select a first reference distance in a reference distance list according to touch input modes. On the order hand, when touch information by the stylus pen touch is detected, the electronic device may select a second reference distance in the reference distance list according to touch input modes. Herein, the second reference distance is greater than the first reference distance.

Thereafter, in step 707, the electronic device determines whether or not a touch point is changed. In other words, the electronic device may determine whether the touched-down point detected in step 701 is changed by a touch movement.

When at step 707 the touch point has not changed, the electronic device next performs step 711. In step 711, the electronic device determines whether a touch up is detected. In other words, the electronic device may determine whether the touch down detected in step 701 is released.

On the other hand, when at step 707 the touch point has changed, the electronic device performs step 709. In step 709, the electronic device scrolls a screen according to the change of the touch point. In other words, the electronic device recognizes that a drag event is generated according to the change of the touch point, and performs an operation corresponding to the drag event.

Thereafter, in step 711, the electronic device determines whether a touch up is detected. For example, the electronic device may determine whether the touch down detected in step 701 is released.

When the touch up is not detected in step 711, the electronic device re-performs step 707 to again determine whether the touch point is changed.

On the other hand, when the touch up is detected in step 711, the electronic device then performs step 713. In step 713, the electronic device compares the change distance of the touch point with the reference distance in order to determine whether the touch point is changed over the reference distance. In other words, the electronic device may determine whether the change distance of the touch point is less than the reference distance.

When the change distance of the touch point is greater than or equal to the reference distance, the electronic device recognizes that the touch point is changed over the reference distance. Therefore, the electronic device ends the algorithm.

On the other hand, when at step 713 the change distance of the touch point is less than the reference distance, the electronic device recognizes that the touch point has not changed over the reference distance. Therefore, the electronic device performs to step 715. In step 715, the electronic device recognizes that a touch tap event is detected. Therefore, the electronic device performs an operation corresponding to the touch tap event in the application program. Thereafter, the electronic device ends the algorithm.

In the above-described exemplary embodiment, the electronic device may determine a reference distance for adaptive recognition of a touch tap according to a hand touch and a pen touch. However, the electronic device may adaptively determine a reference distance for recognition of the touch tap event similarly with respect to other touch input modes than the hand touch and the pen touch.

In the above-described exemplary embodiment, the electronic device may recognize that a drag event is generated when the change distance of a touch point is greater than or equal to a reference distance. However, the electronic device may generate touch events other than the drag event in consideration of the change distance of a touch point according to a characteristic of an application program that is being executed.

As described above, the electronic device having a touchscreen can accurately recognize touch information by adaptively setting a reference distance for recognition of a touch tap.

The above-described apparatus and a method of operation according to the present invention can be implemented in hardware, and in part as firmware or as software or computer code that is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" or "controller" comprise hardware in the claimed invention. Under the broadest reasonable interpretation, the appended claims constitute statutory subject matter in compliance with 35 U.S.C. §101.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for recognizing touch information in an electronic device, the method comprising:
   detecting a touch input based on a touch screen;
   determining whether or not to use a reference distance based on at least one of an executed application, a user interface displayed on the touch screen, and a touch point of the touch input;
   responsive to determining to use the reference distance:
      determining the reference distance based on whether the touch input is a hand touch input or a pen input;
      determining an event type corresponding to the touch input detected by the touch screen by comparing a change distance of a touch point related to the touch input detected by the touch screen with the reference distance; and
      executing an application program according to the determined event type; and
   responsive to determining not to use the reference distance, using a fixed distance for determining an operation for the touch input.

2. The method of claim 1, wherein determining the reference distance comprises one of:
   selecting a first reference distance when a touch down by the hand touch input is determined; and selecting a second reference distance when a touch down by the pen touch input is determined,
wherein the second reference distance is set to be greater than the first reference distance.

3. The method of claim 1, wherein determining the event type comprises:
comparing the change distance of the touch point detected by the touch screen with the reference distance when the touch point at which the touch is detected has changed; and
determining whether a drag event is generated according to a result of the comparison of the change distance of the touch point with the reference distance.

4. The method of claim 3, further comprising:
when the drag event is not generated, determining whether the touch is released from the touch screen; and
when the touch is released, determining that a touch tap event for the point at which the touch is detected is generated.

5. The method of claim 1, wherein the determining whether or not to use a reference distance comprises:
executing the application program by a processor; and
determining whether or not to use the reference distance based on a characteristic of the application program.

6. The method of claim 1, wherein the determining whether or not to use a reference distance comprises:
determining whether or not to use the reference distance based on a characteristic of the user interface displayed on a display unit.

7. The method of claim 1, wherein the determining whether or not to use a reference distance comprises:
determining whether or not to use the reference distance based on a characteristic of the touch point at which the touch input is detected.

8. The method of claim 1, wherein determining the event type comprises:
when the detected touch input is released, comparing the change distance of the touch point with the reference distance; and
determining the event type for the detected touch according to a comparison result of the change distance of the touch point and the reference distance.

9. The method of claim 8, further comprising:
when the touch point at which the touch is detected is changed prior to the touch being released, recognizing that a drag event is generated according to the change of the touch point.

10. An electronic device, comprising:
a touch screen configured to detect a touch input; and
a touch processing unit in communication with the touch screen configured to detect the touch input based on the touch screen, determining whether or not to use a reference distance based on at least one of an executed application, a user interface displayed on the touch screen, and a touch point of the touch input,
responsive to determining to use the reference distance:
determine the reference distance based on whether the touch input is a hand touch input or a pen input, and
determine an event type for the detected touch input by comparing a change distance of a touch point at which the touch input is detected with the reference distance, and
responsive to determining not to use the reference distance, using a fixed distance for determining an operation for the touch input.

11. The electronic device of claim 10, wherein the reference distance comprises one of a first reference distance selected by the touch processing unit when a touch down by the hand touch input is determined, and a second reference distance selected by the touch processing unit when a touch down by the pen touch input is determined, and
wherein the second reference distance is set to be greater than the first reference distance.

12. The electronic device of claim 10, wherein the touch processing unit determines whether a drag event is generated by comparing the change distance of the touch point with the reference distance when the touch point at which the touch is detected is changed.

13. The electronic device of claim 12, wherein the touch processing unit determines whether or not the touch is released from the touch screen when the drag event is not generated, and determines a touch tap event for the touch point at which the touch detected when the touch is released from the touch screen.

14. The electronic device of claim 10, further comprising an application program execution unit including a microprocessor for executing an application program,
wherein the touch processing unit determines whether or not to use the reference distance based on a characteristic of the application program.

15. The electronic device of claim 10, further comprising a display unit including a display for outputting user interface information,
wherein the touch processing unit determines whether or not to use the reference distance, based on a characteristic of the user interface displayed on a display unit.

16. The electronic device of claim 10, wherein the touch processing unit determines, whether or not to use the reference distance based on a characteristic of the touch point at which the touch input is detected.

17. The electronic device of claim 10, wherein the touch processing unit determines the event type for the detected touch input by comparing the change distance of the touch point with the reference distance when the detected touch input is released.

18. The electronic device of claim 17, wherein the touch processing unit determines that a drag event is generated according to a change of the touch point when the touch point at which the touch is detected is changed before the touch is released.

19. The electronic device of claim 10, further comprising a touch detection unit for converting into an instruction, touch information detected by the touch screen,
wherein the touch processing unit determines the reference distance in consideration of the touch input for the touch information detected by the touch detection unit.

20. The electronic device of claim 19, wherein the touch processing unit receives the touch input information from the touch detection unit.

21. The electronic device of claim 19, wherein the touch processing unit determines the touch input for the touch information according to the instruction for the touch information received from the touch detection unit.

22. The electronic device of claim 19, wherein the touch processing unit determines the touch input for the touch information based on touch input mode identification information received from the touch detection unit.

* * * * *